(12) United States Patent
Brockett et al.

(10) Patent No.: US 7,991,609 B2
(45) Date of Patent: Aug. 2, 2011

(54) WEB-BASED PROOFING AND USAGE GUIDANCE

(75) Inventors: Chris Brockett, Bellevue, WA (US);
William Dolan, Kirkland, WA (US);
Michael Gamon, Seattle, WA (US);
Jianfeng Gao, Redmond, WA (US);
Lucy Vanderwende, Sammamish, WA (US); Hsiao-Wen Hon, Beijing (CN);
Ming Zhou, Beijing (CN); Gary Kacmarcik, Bothell, WA (US);
Alexandre Klementiev, Urbana, IL (US)

(73) Assignee: Microsoft Corporation, Redmond, WA (US)

( * ) Notice: Subject to any disclaimer, the term of this patent is extended or adjusted under 35 U.S.C. 154(b) by 988 days.

(21) Appl. No.: 11/713,073

(22) Filed: Feb. 28, 2007

(65) Prior Publication Data

US 2008/0208567 A1   Aug. 28, 2008

(51) Int. Cl.
*G06F 17/27* (2006.01)
(52) U.S. Cl. ............ 704/9; 704/1; 704/10; 704/2; 704/8; 715/255; 715/256; 715/257
(58) Field of Classification Search .................. 704/1, 9, 704/10; 715/255, 256, 257
See application file for complete search history.

(56) References Cited

U.S. PATENT DOCUMENTS

| | | | | |
|---|---|---|---|---|
| 5,068,789 A * | 11/1991 | van Vliembergen | ............... | 704/9 |
| 5,380,105 A * | 1/1995 | Shimada et al. | ................ | 400/63 |
| 5,521,816 A * | 5/1996 | Roche et al. | ....................... | 704/9 |
| 5,537,317 A * | 7/1996 | Schabes et al. | .................... | 704/9 |
| 5,845,306 A * | 12/1998 | Schabes et al. | ................ | 715/209 |
| 5,870,700 A * | 2/1999 | Parra | ................. | 704/9 |
| 5,875,443 A | 2/1999 | Nielsen | .............. | 707/2 |
| 5,890,182 A * | 3/1999 | Yagisawa et al. | ............. | 715/236 |
| 6,012,075 A * | 1/2000 | Fein et al. | ...................... | 715/256 |
| 6,085,206 A * | 7/2000 | Domini et al. | ................ | 715/257 |
| 6,219,453 B1 * | 4/2001 | Goldberg | ...................... | 382/229 |
| 6,349,295 B1 * | 2/2002 | Tedesco et al. | ........................ | 1/1 |
| 6,424,983 B1 * | 7/2002 | Schabes et al. | ............... | 715/257 |
| 6,470,363 B1 * | 10/2002 | Kanerva et al. | ............... | 715/208 |
| 6,507,858 B1 * | 1/2003 | Kanerva et al. | ............... | 715/234 |
| 6,601,059 B1 | 7/2003 | Fries | ................. | 707/3 |
| 6,732,333 B2 * | 5/2004 | Selby | ............................ | 715/257 |
| 6,947,918 B2 * | 9/2005 | Brill | ............................... | 706/45 |

(Continued)

OTHER PUBLICATIONS

Arppe, Develpoing a grammar checker for Swedish, 2000, The 12th Nordic Conference of Computational Linguistics, Citeseer, pp. 13-27.*

(Continued)

*Primary Examiner* — David R Hudspeth
*Assistant Examiner* — Lamont M Spooner
(74) *Attorney, Agent, or Firm* — Westman, Champlin & Kelly, P.A.

(57) ABSTRACT

A system is disclosed for checking grammar and usage using a flexible portfolio of different mechanisms, and automatically providing a variety of different examples of standard usage, selected from analogous Web content. The system can be used for checking the grammar and usage in any application that involves natural language text, such as word processing, email, and presentation applications. The grammar and usage can be evaluated using several complementary evaluation modules, which may include one based on a trained classifier, one based on regular expressions, and one based on comparative searches of the Web or a local corpus. The evaluation modules can provide a set of suggested alternative segments with corrected grammar and usage. A followup, screened Web search based on the alternative segments, in context, may provide several different in-context examples of proper grammar and usage that the user can consider and select from.

18 Claims, 8 Drawing Sheets

U.S. PATENT DOCUMENTS

| | | | |
|---|---|---|---|
| 6,976,214 B1 * | 12/2005 | Bates et al. | 715/236 |
| 7,003,446 B2 | 2/2006 | Trower, II et al. | 704/9 |
| 7,113,950 B2 | 9/2006 | Brill et al. | 707/100 |
| 7,243,095 B2 * | 7/2007 | Chang et al. | 704/9 |
| 7,243,305 B2 * | 7/2007 | Schabes et al. | 715/257 |
| 7,483,833 B2 * | 1/2009 | Peters | 704/270 |
| 7,664,629 B2 * | 2/2010 | Dymetman et al. | 704/4 |
| 2004/0030540 A1 * | 2/2004 | Ovil et al. | 704/1 |
| 2005/0210017 A1 | 9/2005 | Cucerzan | 707/3 |
| 2005/0210383 A1 | 9/2005 | Cucerzan et al. | 715/533 |
| 2006/0123329 A1 * | 6/2006 | Steen et al. | 715/500 |
| 2006/0143564 A1 | 6/2006 | Bates et al. | 715/533 |
| 2006/0161520 A1 | 7/2006 | Brewer et al. | 707/3 |
| 2006/0241944 A1 | 10/2006 | Potter et al. | 704/254 |
| 2006/0259861 A1 | 11/2006 | Watson | 715/705 |
| 2007/0219776 A1 * | 9/2007 | Gamon et al. | 704/9 |

OTHER PUBLICATIONS

Naber, A rule-based sytel and grammar checker, 2000, Citeseer, pp. 1-76.*

"Spelling and Grammar Checking Using the Web as a Text Repository", Kai A. Olsen & James G. Williams, Journal of the American Society for Information Science and Technology, vol. 55, No. 11, pp. 1020-1023 (2004).

"Un corrector gramatical basat en cerques per Internet" ("A Grammar Checker Based on Web Searching"), Joaquim Moré, Digithum, No. 8 (May 2006).

"Scaling Up Context-Sensitive Text Correction", Andrew J. Carlson et al., IAAI (2001), pp. 45-50.

* cited by examiner

200

```
┌─────────────────────────────────────────────────────────────┐
│                                                             │
│  201 - EVALUATE WHETHER ONE OR MORE STRINGS OF TEXT INCLUDE │
│                     NON-STANDARD USAGE                      │
│                                                             │
└─────────────────────────────────────────────────────────────┘
                               │
                               ▼
┌─────────────────────────────────────────────────────────────┐
│                                                             │
│  203 - PROVIDE AN INDICATION THAT A STRING OF TEXT INCLUDES │
│       NON-STANDARD USAGE, WITH ONE OR MORE SUGGESTED        │
│                ALTERNATIVE STRINGS OF TEXT                  │
│                                                             │
└─────────────────────────────────────────────────────────────┘
                               │
                               ▼
┌─────────────────────────────────────────────────────────────┐
│                                                             │
│     205 - PROVIDE ONE OR MORE EXAMPLES OF USAGE OF THE ONE OR│
│           MORE SUGGESTED ALTERNATIVE STRINGS OF TEXT        │
│                                                             │
└─────────────────────────────────────────────────────────────┘
```

FIG. 2

WEB-BASED PROOFING AND USAGE GUIDANCE

BACKGROUND

Traditional grammar checkers check a document against a set grammar reference, identify violations of that reference, and offer the user a grammar correction indicated for that particular error by the reference. While such grammar checkers perform a valuable function, there is a limit to what they can accomplish. Even though a large library of grammar rules may be stored, natural human languages tend to be filled with matters of context, nuance, and ambiguity, that resist rigid application of rote rules. Grammar checkers also may be encoded with certain choices of rules in accordance with one or another particular set of prescriptive guidelines, but which are out of step with a properly descriptive grammar that genuinely reflects actual language usage by its native speakers, or at least by a large segment thereof. Such prescriptive guidelines may also enshrine grammatical rules that are ultimately arbitrarily based on one or another grammatical school of thought, but which run counter to actual usage in traditional, mainstream, widely esteemed exemplars of the language. Prescriptive, arbitrary, or rigidly uniform grammar rules are also unlikely to accurately reflect shifts in usage appropriate to different styles of writing, different target audiences, and different registers of language. The same subtleties in grammar and usage that are prohibitively difficult for a traditional grammar checker to distinguish are also unlikely to be easily accessed in a reference work, particularly for non-native speakers of the language in question, for whom there is no easy substitute for long-term experience with native usage in context.

The discussion above is merely provided for general background information and is not intended to be used as an aid in determining the scope of the claimed subject matter.

SUMMARY

A system is disclosed for checking grammar and usage using a flexible portfolio of different error correction modules, and automatically providing a variety of different examples of standard, real-life usage in an analogous context, based on a filtered search of Web content and/or a large corpus of native usage. For example, in one illustrative embodiment, a method can be used for checking the grammar and usage in any application that involves natural language text, such as word processing, email, and presentation applications. The grammar and usage can be evaluated using several complementary evaluation modules, which may include one based on a trained classifier, one based on regular expressions, and one based on comparative searches of the Web or a local corpus. The evaluation modules can provide a set of suggested alternative segments with corrected grammar and usage. A followup, screened Web search based on the alternative segments, in context, may provide several different in-context examples of proper grammar and usage that the user can consider and select from. Additional embodiments may also include software and computer systems enabled to perform a variety of tasks related to Web-based proofing and usage guidance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 2 depicts a flowchart of a method, according to an illustrative embodiment.

DETAILED DESCRIPTION

Figure 1:
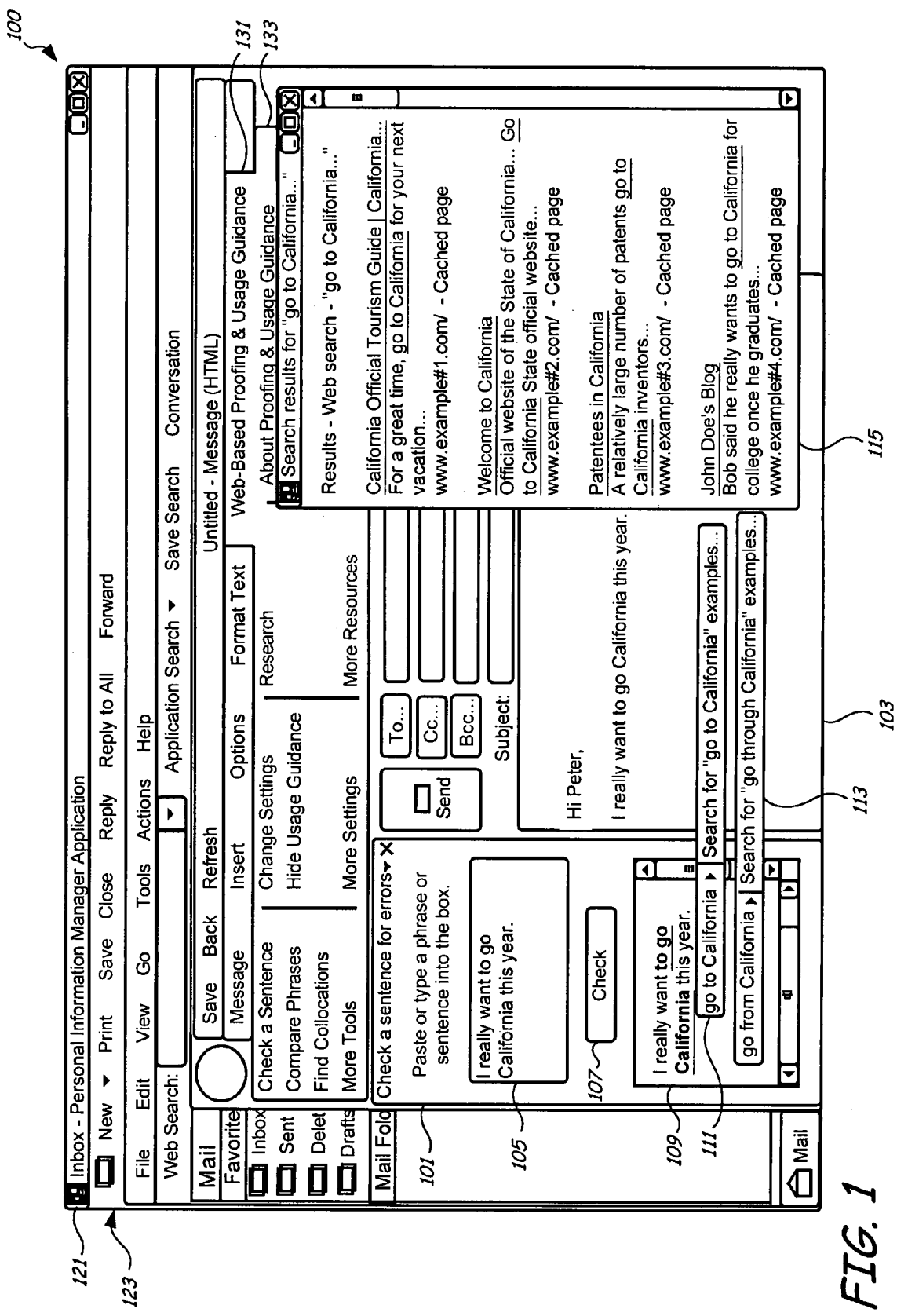
FIG. 1 depicts an application interface for a computing system enabling a method, according to an illustrative embodiment.

FIG. 1 depicts a screenshot of an application interface 100 for a computing system that enables a method for Web-based proofing and usage guidance, according to an illustrative embodiment. Application interface 100 may be illustrative of embodiments that include computing systems, and executable instructions configured to be executable by computing systems, and contexts that enable method embodiments, for example. The following discussion provides further details of various illustrative embodiments. While certain illustrative arrangements and labels, and samples of text being compared by a computer-implemented method, are included in this and the subsequent figures, they are intended not to indicate any limitations, but rather to provide an illustrative example the variety and broader meaning provided in the discussion and claims herein.

Application interface 100 constitutes a graphic display panel associated with a software application, one of many graphic display panels that may be open at one time in a graphical user interface on an output device such as a computer monitor, in the illustrative embodiment of FIG. 1. Application interface 100 is labeled "Inbox—Personal Information Manager Application" in the title bar 121, in reference to one illustrative embodiment directed to providing Web-based proofing and usage guidance in a personal information manager application or an email application. A set of computer-executable instructions that implement a Web-based proofing and usage guidance method may be included in a personal information manager application or email application as a module, object, subroutine, or other component of the application; or it may also run as a separate application that interacts with the information manager application or email application, for example. Other embodiments may also be implemented that are not limited to these illustrative examples. The illustrative embodiment of FIG. 1 is referred to repeatedly in the discussion below, with the understanding that it is by way of an illustrative example only, indicative of broader principles that may be applied to a wide range of other embodiments.

Application interface 100 includes a variety of interactive input and output user interface elements, or "widgets", such as the well-known menu buttons for "new", "print", "save", "close", "file", "edit", "view", and others generally indicated among user interface elements 123. These also include a menu button 131 directed to the email aspect of the application, labeled "Web-based proofing & usage guidance". This button has been selected in the view of FIG. 1, revealing ribbon 133, which includes a variety of tools, settings, resources, and information about a web-based proofing & usage guidance software component. In general, these interface elements enable general functionality for the information manager application, as well as functionality for Web-based proofing and usage guidance, which may be used in conjunction with the information manager application.

Among the user interface elements are text input field 103, which may be used for inputting text for an email message; and interface box 101, which includes control elements for active user engagement with the web-based proofing & usage guidance software component. User interface box 101 may be called up adjacent to text input field 103 as an option, while the Web-based proofing & usage guidance software component may also be allowed to function passively, in another illustrative embodiment, so that it runs in the background while the user is inputting text to appear in text input field 103, and only surfaces a graphical output if an erroneous or otherwise disfavored aspect is detected in the grammar or usage of the text being input in text input field 103. Other implementation options may also be used in other embodiments.

Text input field 103 includes the title "Check a sentence for errors", and the caption, "Paste or type a phrase or sentence into the box." Below the caption are a text input box 105, a button 107 labeled "check", and an output box 109 that provides a suggestion for revising the input in text input box 105 provided by the Web-based proofing & usage guidance software component. Output box 109 may provide an indication of whether or not the string of text includes non-standard usage, along with one or more suggested alternative strings of text. If the string is not found to contain non-standard usage, output box 109 may simply assert this fact, or provide a statement to the effect of "the usage check is complete". Providing an indication that the string is found to contain non-standard usage may include an explicit statement to that effect, or may be implicit in output box 109 providing a corrected suggestion.

While a text string may be pasted or typed into text input box 105 in one implementation, it may also be selected automatically in another implementation. Adjacent to interface box 101 are also popup interface boxes 111 and 113. Popup interface box 111 includes the text revision suggestion "go to California", along with a button allowing the option to "search for 'go to California' examples"; while popup interface box 113 includes another text revision suggestion, "go through California", along with a button allowing the option to "search for 'go through California' examples". The suggestion featured in popup interface box 111 matches that provided in output box 109 within interface box 101.

In the depiction of FIG. 1, a user has selected the button in popup interface box 111, as a result of which, the Web-based proofing & usage guidance software component has presented popup output box 115, in this illustrative embodiment. Popup output box 115 provides the results of a Web search for the text string "go to California", including examples of how the string "go to California" is used in the featured websites, together with such features as the title bars and URLs of the websites. The examples of usage provided in popup output box 115 are particularly selected to provide well-representative and relevant examples of usage of this particular text string, provided as a result of a process which is depicted and described in relation to the subsequent figures, in a variety of illustrative embodiments. Popup output box 115 also includes a vertical scroll bar, indicating that many other examples are provided; and an option may also be provided to proceed to additional pages of search results, to open the indicated websites so more of the context of the usages may be seen, to view the search results in other formats, and so forth. While an information manager application including an email functionality has been portrayed in FIG. 1 as an illustrative context with which a Web-based proofing & usage guidance method or software component may be implemented, other implementations may be used as stand-alone applications or in combination or cooperation with any other kind of application, including word processing applications, presentation applications, publishing applications, and any other type, in different embodiments.

By providing well-selected examples of grammar and usage culled from the Web, the implementation depicted in FIG. 1 provides a more flexible and more instructive capability than a traditional fixed-algorithm grammar checker. For example, such an implementation may be particularly useful for non-native speakers of the language being used in the application, especially as many of such a user's grammar or usage errors may depend heavily on context or even on world knowledge, which may be difficult to prohibitive for a machine to correct reliably, or for the non-native speaker to be able to systematically pick up from a textbook or learner's dictionary. This may be especially true since the suggestions and/or examples provided may be made in light of the surrounding words of the text written by the user, tending to ensure that the suggestions and/or examples will be more relevant to the user's intentions. These advantages would also be useful for proofing and providing usage guidance for native speakers.

As one example, a non-native speaker of English may be unsure whether to use a definite or indefinite article, or no article, in a given instance, e.g. whether to write "from the desk of Dr. Jones", "from a desk of Dr. Jones", or "from desk of Dr. Jones". This may be particularly true for a native speaker of a language such as Mandarin Chinese that does not use articles, so that "the" and "a" have no direct translation in the native speaker's language and are foreign concepts. The identification of "from the desk of Dr. Jones" as proper usage, as opposed to "from a desk of Dr. Jones" or "from desk of Dr. Jones", is also not likely to be found, or at least likely to be indexed and easily findable, in a textbook or language learner's dictionary. However, providing one or an other of these variants in the text field of an email application or word processing application, for example, or in a text input field of a dedicated user interface such as text input box 105, and providing the text string to be acted on by a Web-based proofing & usage guidance method or software component, may quickly and easily provide a selection of optimized suggestions and examples of grammar and usage.

While certain interface elements are depicted in the embodiment of FIG. 1 with particular characteristics, other options within this embodiment provide different aspects of implementation, as do embodiments that may include a broad variety of other formats and details of implementation.

Figure 3:
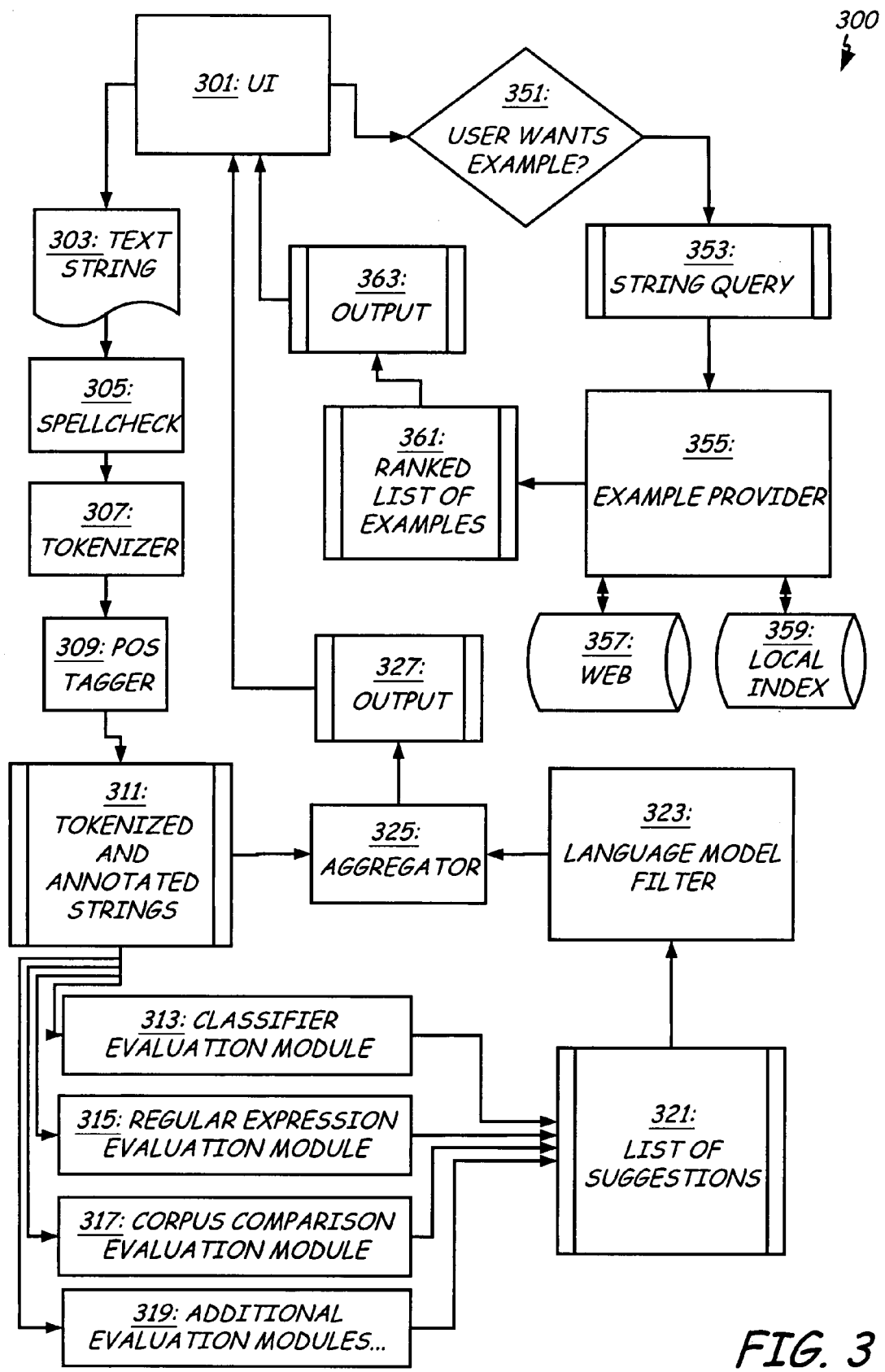
FIG. 3 depicts a software architecture, according to an illustrative embodiment.

FIG. 2 provides a flowchart for an illustrative embodiment of a method 200 for Web-based-proofing & usage guidance, on a sample of text that may be retrieved from an accessible application or indicated in a text sample. Method 200 includes step 201, of evaluating whether one or more strings of text include non-standard usage; step 203, of providing an indication that a string of text includes non-standard usage, with one or more suggested alternative strings of text; and step 205, of providing one or more examples of usage of the one or more suggested alternative strings of text. Method 200 may be consistent with the implementation depicted in FIG. 1, and with a wide variety of other implementations; and may include additional steps and aspects. FIG. 3 depicts a software system 300 consistent with the method of FIG. 2, which illustrates the functioning of FIG. 2 as well as some illustrative further steps and aspects that may be included with method 200.

For example, a text sample that includes one or more strings of text may be selected or indicated in a user interface 301 of software system 300 of FIG. 3, which may be consistent with text input field 103 or text input box 105 of FIG. 1, for example. The selected or indicated text strings 303 may also be parsed or otherwise pre-processed prior to step 201, of evaluating whether one or more strings of text 303 include non-standard usage. The parsing or pre-processing may include processing by software components such as spell checking module 305, tokenizing module 307, and/or part-of-speech tagging module 309, for example, among other potential pre-processing tasks. The output of the combined pre-processing modules is a set of tokenized and annotated strings 311, or strings that may be otherwise processed, or not processed, in other embodiments.

Step 201 may also include subjecting a sample of text, such as strings 311, to at least one of one or more usage evaluation modules that identify segments of the sample of text that have non-standard usage. In this context, usage may serve as a generalized term that includes grammar, and "non-standard" may include usages that are generally recognized by native speakers to be grammatically erroneous per se, or are otherwise found to be awkward, to be disfavored, to have aspects in common with deprecated or substandard usage as opposed to known good usage, or otherwise not to correspond with standard usage.

Different usage evaluation modules and combinations thereof may be used in different embodiments. A common application protocol interface may be implemented for accessing usage evaluation modules, so that different usage evaluation modules may be added in or exchanged, in an otherwise ongoing implementation. This may allow usage evaluation modules to be easily modified and/or new usage evaluation modules to be developed and added to software system 300 from any source, allowing software system 300 to remain flexible and open to new improvements in usage evaluation that may become available.

In the illustrative embodiment of FIG. 3, software system 300 may include exemplary usage evaluation modules 313, 315, 317, and 319. These include a classifier-based evaluation module 313; a regular expression based evaluation module 315; a corpus comparison evaluation module 317, which compares the text strings with search results from the Web and/or another corpus; and additional evaluation modules 319, which may include any number of present and/or future evaluation modules using any other mechanism to generate the suggestions, such as statistical machine translation, or some form of grammatical analysis such as dependency or phrasal parse, as a couple of illustrative examples. Any one module or combination of these modules may be used in different embodiments, and other embodiments are not limited to the specific modules depicted here. The modules may each, in different ways, act to identify segments that have non-standard usage, and determine one or more alternative text segments that potentially correct an aspect of usage in the candidate text segment. Additional aspects of classifier-based evaluation module 313 and corpus comparison evaluation module 317 are depicted and described with respect to FIGS. 4 and 5, further below.

The results from the various modules used may be assembled as a list of suggestions 321. These may be passed through a language model filter 323 and aggregator 325, before the information from the original raw list of suggestions 321 is processed into a finalized output 327 to surface in the user interface 301, thereby providing an indication that a string of text includes non-standard usage, along with providing one or more suggested alternative strings of text, derived from the list of suggestions 321. The tokenized and annotated sentences 311 may also be passed directly to the aggregator 325 as a basis of comparison for the suggestions, to assist in assembling the finalized version of the output 327. The indication and the suggested alternative strings of text may for example be surfaced in the manner depicted in output box 109 of FIG. 1, according to that particular illustrative embodiment.

Figure 6:
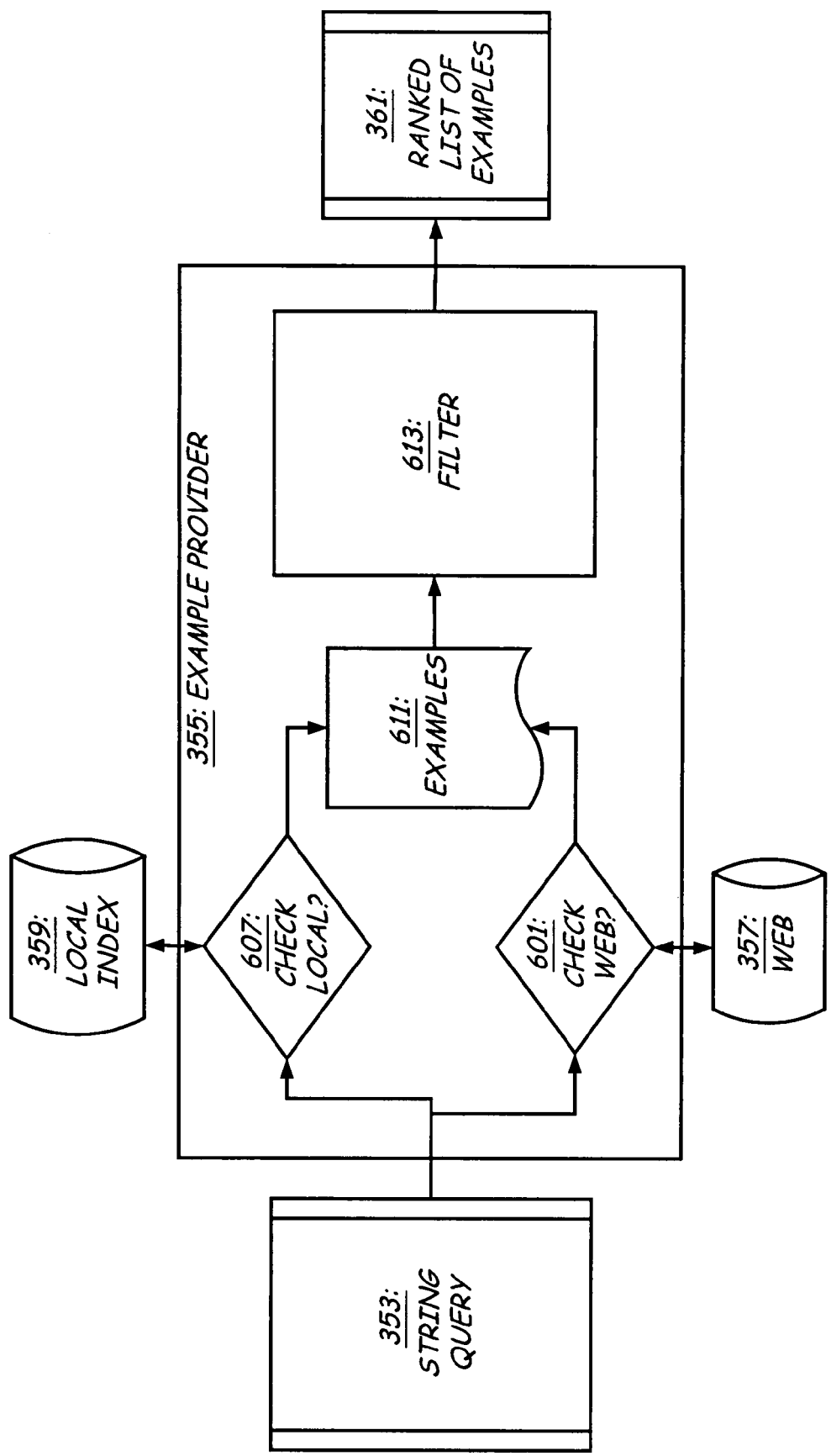
FIG. 6 depicts a software architecture, according to an illustrative embodiment.

Also as depicted in the illustrative example of FIG. 1, popup interface boxes 111 and 113 may also include information associated with the suggested alternative strings of text, along with options for a user to opt for examples of usage of the suggested alternative strings of text, as represented in decision node 351 of FIG. 3. If the user selects this option, relative to a particular one of the suggestions provided in output 327, the indicated suggestion is submitted as a string query 353 to example provider 355 for a search of exemplary content. This search for usage examples may include a search of the Web 357, and/or a search of a local index 359, such as one associated with a locally stored corpus, which may possibly include examples of usage taken from a dictionary, such as a learner's dictionary, or a grammar reference, for example. Examples from the Web 357 and from local index 359 may be presented together or separately, and may be ordered and ranked together or separately in different presentations of the examples. Additional aspects of example provider 355, in accordance with one illustrative embodiment, are further provided with respect to FIG. 6, further below. The search may be performed with a query that includes not only the alternative text segment from the selected suggestion, but also other indicators from the context of the user's input, such as one or more other elements of text included proximate to the candidate text segment in the text sample. This may promote the likelihood for examples to be selected that are close in context and/or content to the user's intentions.

The results from example provider 355 may be processed into a ranked list of examples 361, which may be provided as output 363 to user interface 301. For example, the output 363 that provides the ranked list of examples 361 may take the exemplary form of popup output box 115 from FIG. 1, in accordance with that illustrative embodiment. The user may consult the examples thus provided, and may select an option for the indicated usage to be filled in as an automatic replacement for the user's original text, or the user may use the examples as objects to study and get a better feel for the way the usage is deployed in the examples provided. The user may thereby use the information provided to make an informed decision about a correction to be made, and to become better able to use a proper or otherwise more skilled usage in a similar context in the future.

Returning to the evaluation modules 313, 315, 317, 319, each of the evaluation modules may use a different mechanism to provide an output that includes one or more potential suggestions of erroneous or disfavored usage. In the present illustrative embodiment, each of these suggestions produced by the evaluation modules may include an indication of the location of the indicated disfavored usage in the text strings, with the location marked by a start index and an end index; a confidence score, indicating the estimated likelihood that the usage is genuinely erroneous or otherwise disfavored; a marker of identification of which of the evaluation modules it was that generated the suggestion; a rewrite string, constituting the suggestion for correcting the text string; a query, to be used to find example sentences, in the event that the user opts to search for examples of the usage represented in the suggestion; a list of one or more context words from proximate to the disfavored element within the text string, to use to refine the example search query; and indications of language model scores, that may potentially be used for filtering and aggregating the suggestions. Any one or combination of these elements, along with other potential elements, may be included in the information provided by the evaluation modules with the suggestions, in different embodiments.

According to this illustrative embodiment, therefore, the tokenized and annotated strings 311 may be provided with a script that provides a list of structures, each structure including a string of tokens, an index, and an accompanying string of part-of-speech tags and possibly other grammatical information as necessary, which may serve as the input to the evaluation modules 313, 315, 317, 319. The action of evaluation modules 313, 315, 317, 319 on this input may result in the production of the list of suggestions 321 as output.

Similarly, the ranked list of examples 361 may be provided with a script that provides a list of structures, each structure including an indication of the example being sent, a URL or other source from which the example was taken, and a snippet of text from the source that contains the example of usage.

Figure 4:
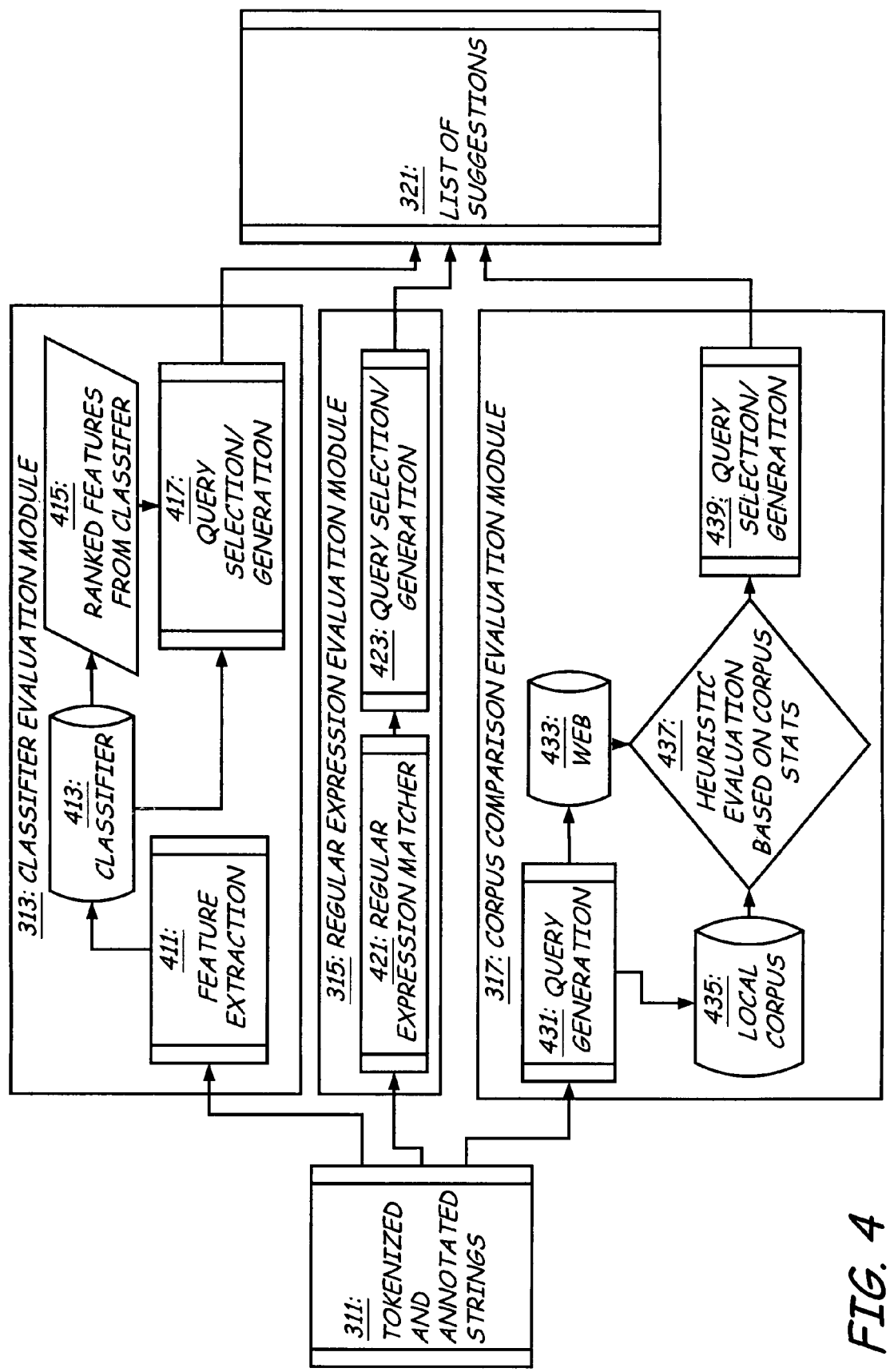
FIG. 4 depicts a software architecture, according to an illustrative embodiment.

FIG. 4 depicts a portion of software system 300 including tokenized and annotated strings 311, illustrative evaluation modules 313, 315, and 317, and list of suggestions 321, according to an exemplary embodiment. FIG. 4 provides additional detail for the structure of illustrative evaluation modules 313, 315, and 317, according to this embodiment. Other embodiments are not limited to the specific details of FIG. 4, but may provide analogous evaluation modules with different structures, as well as different means for evaluating the strings, for example.

Evaluation module 313 is based on using a machine learned classifier to evaluate the strings. Evaluation module 313 includes feature extraction module 411, classifier 413, ranked features 415 from the classifier 413, and query selection/generation module 417. Evaluation module 313 extracts lexical features from the strings of text and evaluates the lexical features with a classifier. Classifier 413 may take any of a wide variety of forms, illustratively including a decision tree, a support vector machine, and so forth. The classifier may have been previously trained by a machine learning process based on any of a wide variety of possible lexical features that may be extracted from the text, such as word n-grams, grammatical sequences and grammatical relations such as dependencies and the identity of the head of a phrase, etc.

The output of classifier 413 may include ranked features 415. Both ranked features 415 from classifier 413, as well as additional output from classifier 413, may be used for query selection/generation 417, such that classifier 413 evaluates whether an error is present in the input string, and provides one or more suggested alternative strings of text that are incorporated in list of suggestions 321. Classifier 413 may evaluate the lexical features of the sequence of words, and the corresponding sequence of part-of-speech tags, in the input string. The suggestions provided by classifier 413 may be based on at least one lexical feature found to be a relatively close match for a string of text with non-standard usage, as provided among the tokenized and annotated strings 311, in this illustrative embodiment. The output directly from classifier 413 to query selection/generation 417 indicates the potential to use the features that the classifier has based its decision on to inform the formulation of the query, so that a subsequent step of providing examples is directed to examples that are close to the input sentence, in terms of the lexical features or other characteristics evaluated by the classifier.

In one illustrative embodiment, the classifier 413 may be trained on large data sets of annotated errors and corrected counterparts. In another embodiment, the training data for classifier 413 may include a corpus of highly standardized native usage of the language in question. This might include, for example, a selection of content from any combination of leading newspapers, news wire services, encyclopedias, journals, magazines, and/or other analogous content sources. The corpus may include on the order of millions of sentences, in one illustrative embodiment.

The classifier may be trained to target certain types of non-standard usage involving one or more particular grammatical elements. For example, this may include targeting erroneous use of prepositions, or erroneous use of determiners, in one illustrative embodiment. Different specifically targeted error types may be selected that are found to be made with particularly higher frequency by users in general, or among users of a specific target group, such as native speakers of one particular language or language group writing in the target language. Specifically targeted error types may also be focused on types that particularly depend on semantic distinctions that are highly dependent on context or world knowledge that would be particularly difficult for a typical, algorithmic or mechanical rule-based grammar checker to evaluate correctly.

As one particular example, errors in usage of determiners and prepositions may be specifically targeted for native speakers of languages that do not have determiners and that use postpositions that function very differently from prepositions, so that there is no direct translation in the user's native language of the targeted lexical features. For example, three major East Asian languages, Mandarin Chinese, Japanese and Korean, although different from each other in many ways, share in common a lack of use of determiners and very different analogs to prepositions, and empirical evidence confirms that errors in these two lexical features make up a disproportionate number of errors in content written in English by native speakers of the three major East Asian languages mentioned above who have an intermediate proficiency with the English language.

In this illustrative embodiment, for these illustrative targeted error types, for each potential insertion point of a determiner or preposition, context features may be extracted within a window of any selected number of tokens to the right and to the left. For each token within the window, the relative position, the token string, its part-of-speech tag may be extracted. Potential insertion sites may be determined heuristically from the sequence of part-of-speech tags. Based on these features, classifier 413 may be trained for preposition choice and determiner choice. The class values for preposition choice (equivalent to the "confusion set" of a contextual speller) may be limited to a set of 14 prepositions that figure prominently in usage errors found at high rates among native speakers of Mandarin Chinese, Japanese, and Korean, which may be evaluated together with options for "none" and "other", for when none of the 14 prepositions applies: "[none]", "about", "as", "at", "by", "for", "from", in "like", "of", "on", "since", "than", "to", "with", and "[other]" (for prepositions not in the list). Analogously, three class values may be used for determiner choice: "[none]", "the", and "a/an".

Classifier 413 may be implemented as a decision tree that produces probability distributions over class values at their leaf nodes. For a given leaf node, the most likely preposition or determiner may be chosen as a suggestion. If there are other class values with probabilities above heuristically determined thresholds, those may also be included in the list of possible suggestions. These suggestions may be compiled and provided to list of suggestions 321, in this illustrative embodiment.

Evaluation module 317 is based on comparing the one or more strings of text with a corpus, and evaluating whether the one or more strings of text conform with standard usage in the corpus. The corpus in question may include the Web 433, and/or a local corpus 435, for example. Evaluating whether the strings of text conform with standard usage in the corpus comprises evaluating the prevalence of exact matches and/or fuzzy matches of the strings of text in the corpus, or searching for strings that are analogous to the input string. For example, evaluation module 317 may take a formulation in an input string, and count the occurrences of it on the Web or in other corpora, and count the occurrences of possible alternatives, in the same sources. If one of the possible alternatives is much more frequent than the formulation in the input string, this may be taken as a signal that the alternative is the correct sequence, while the formulation in the input string is erroneous or otherwise disfavored.

Searching for fuzzy matches or other analogous strings may include iteratively replacing one of the words in the input string, or a subset string or snippet from within the input string, with a wild card, in one illustrative embodiment. Different levels of subset strings may be defined that incorporate different lengths of content within the original input string. For example, subset strings may be defined at the level of a complete sentence, a reduced sentence, a chunk of text, a phrase, or a sequence of a set number of words. In one embodiment, different weighting scores may also be assigned to different levels of subset strings with different lengths, in recognition that the longer a subset string is, the more it particularly identifies with the content of the input string, and the more relevance it is likely to have.

As an illustrative example, one of the input strings may contain within it the two-word string "rely to". Potential alternatives may be formulated by recognizing that "to" is identified by its part-of-speech tag as a preposition, and creating alternative strings as "rely [prep]", where the "[prep]" term is a wild card that is filled with a different preposition in each of the alternative strings. A search of content on the Web, and/or in other corpora, may indicate that the string "rely on" is far more numerous than the string "rely to" or the other potential alternatives. This may be taken as an indication that "rely on" is the correct way of combining the verb "rely" with a subsequent preposition, so that "rely on" is provided as a suggestion to list of suggestions 321.

Evaluating the likelihood of whether the input string or an alternative string is correct or erroneous may also use methods more sensitive than a simple count among the results of a search. For example, in one illustrative embodiment, the subject language in which the input strings of text are written is detected, and the evaluation module is directed to evaluate the strings of text with reference to the subject language. One Web search may be performed that is restricted to a first set of one or more Web domains indicated to have relatively more reliable language usage in the language of the input strings of text. Another Web search may be done that is restricted to a second set of one or more domains indicated to have relatively less reliable language usage in the language of the strings of text. Then, a relative proportion of matches from search results of the second set compared with matches from search results of the first set may be used as an indicator of non-standard usage. This may be ordered by a general distinction among the top-level domain (TLD) of URLs, and/or by a more specific categorization based on the second-level domain names of the URLs.

For example, with the target strings in English, search results may be taken as indicated to be more likely conforming with proper usage that are taken from content in a standard set of URLs with a TLD of "edu" or "gov", or from specific URLs within the "com", "org", "us", "uk", and analogous TLDs that are associated with known, large sources of reliably proper English language usage, such as the websites of recognized leading news organizations or academic publishers. On the other hand, with the language of the input strings being English, the second set of domains taken as indicated to have relatively less reliable English language usage may include country code TLDs for countries without a significant proportion of native English speakers, such as "jp", "cn", and "kr", the country code TLDs of Japan, the People's Republic of China, and the Republic of Korea. While these TLDs may include a significant amount of content in English that conforms to very high standards of proper grammar and usage, the content found within these TLDs may nevertheless be indicated to have an overall, average level of non-standard English grammar and usage that is relatively greater than that observed on average among the domains selected as the standard set.

Analogously, as another illustrative example, the input strings of text among tokenized and annotated strings 311 may be identified as being in French. The first, standard set of search results may be defined from content found in domains with a TLD of either "fr", "be", "ch", or "ca", i.e. the country code TLDs for France, Belgium, Switzerland, and Canada, respectively; or among more specific domains known to be associated with leading French-language news organizations, universities, academic publishers, and so forth. The second set of content, taken as indicated to provide more examples of erroneous or non-standard French language and usage compared with the standard set, may be defined among French-language content in the general "com" or "org" TLDs, and/or in specific country code TLDs of countries without large proportions of native French speakers, such as "cn", "jp", and "kr", for example.

FIG. 4 does not depict additional evaluation modules 319, but any additional evaluation modules may also be used. The evaluation modules 313, 315, 317 depicted in FIG. 4 and any other evaluation modules may be swapped in and out of software system 300. In an illustrative embodiment, the evaluation modules 313, 315, and 317 are accessed through a single application protocol interface, and additional evaluation modules 319 may be added, provided that they also conform to the application protocol interface. Any of these added evaluation modules may also be used to evaluate the strings of text.

Returning to the illustrative embodiment of software system 300 in FIG. 3, the list of suggestions 321 is provided to a language model filter 323, which acts to filter out spurious suggestions, before the filtered suggestions are passed on to aggregator 325, which composes the suggestions into a finalized form for output 327 provided to user interface 301. The spurious suggestions may include suggested alternative strings of text indicated to be unlikely, unhelpful, or duplicative, for example.

Figure 5:
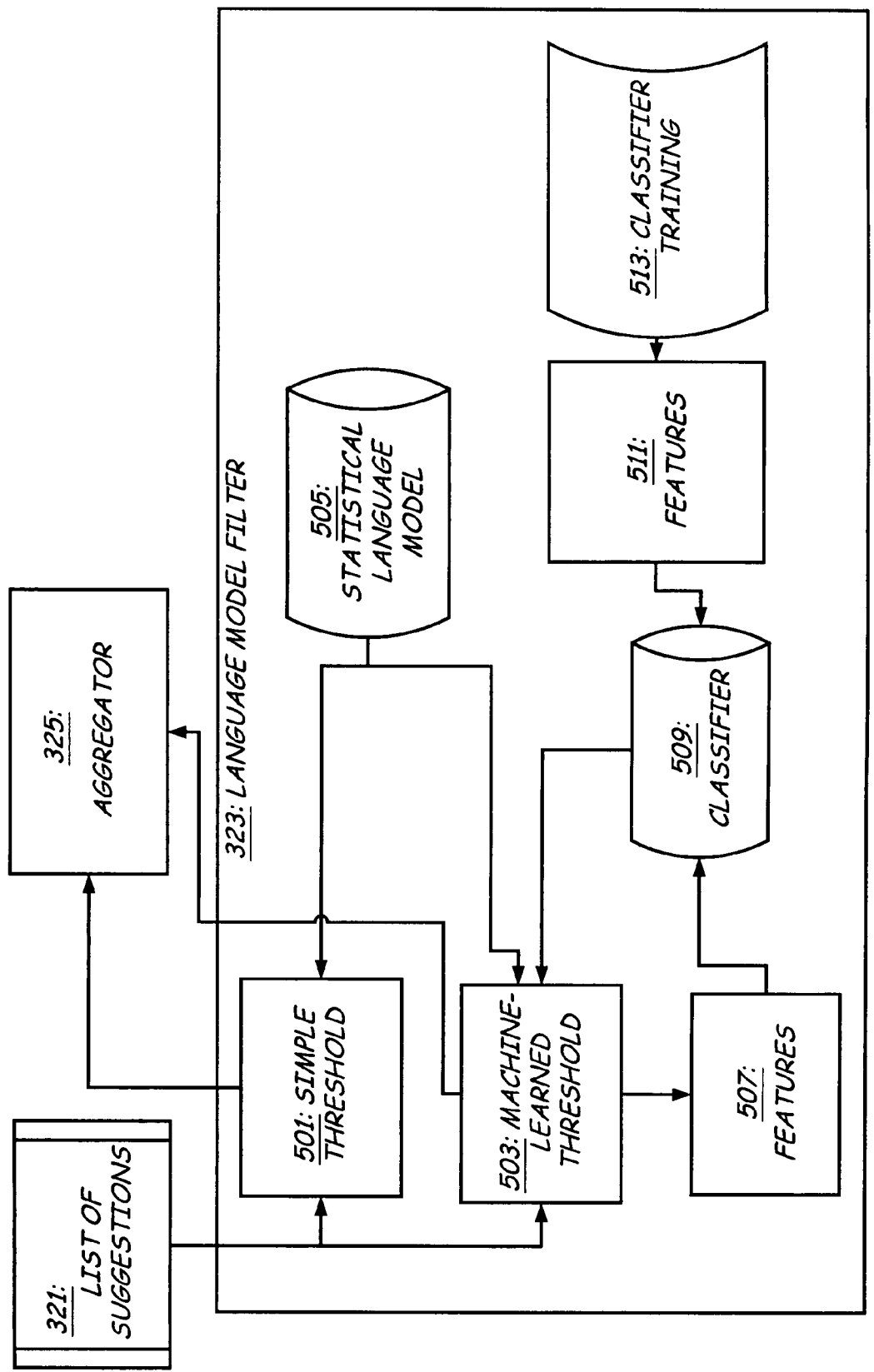
FIG. 5 depicts a software architecture, according to an illustrative embodiment.

FIG. 5 depicts additional details of language model filter 323, according to one illustrative embodiment. Language model filter 323 may use any of a variety of different thresholds to determine which suggestions provided by evaluation modules 313, 315, 317, 319 should be passed on as output, and in what order they should be presented, and which suggestions should be discarded. These may include simple threshold 501, and machine-learned threshold 503, for example, both of which may use input from statistical language model 505 to base their decisions on, that may provide a language model score for a given suggestion, indicating its potential relevance. Whatever thresholding technique is used, language model filter 323 may screen the candidate alternative strings of text from list of suggestions 321 before providing the filtered suggested alternative strings of text to aggregator 325. Language model filter 323 may also rank the suggested alternative strings of text in descending order of the language model score assigned to each of the suggestions, according to statistical language model 505, in this illustrative embodiment.

Simple threshold 501 may include threshold rules that are selected manually, such as meeting a minimum language model score that is greater than that of the original sentence being corrected, or requiring a minimum difference between language model scores, and/or is empirically determined to provide an effective threshold for relevance. Machine-learned threshold 503 provides features of the suggestions to a classifier 509. Such features may include confidence and class probability scores from evaluation modules 313-319, language model scores, delta (difference) between language model score of the original sentence and the corrected sentence and others. Classifier 509 uses features 511 that are produced by a classifier training process 513. Classifier 509 provides its determination of relevance of the candidate suggestions, based on their features 507, back to the machine-learned threshold 503. Classifier 509 may be able to formulate rules for evaluating relevance of the suggestions that are counterintuitive or that would take an inordinate period of trial and error to equal the accuracy of with manually defined rules provided in simple threshold 501. If multiple suggestions pass either simple threshold 501 and/or machine-learned threshold 503, whichever is being used, they may be ranked according to their language model score, with the language model score ranking providing the criterion by which the suggestions are ordered in the output 327 provided to user interface 301.

The output of language model filter 323 is provided to aggregator 325, which may eliminate overlapping suggestions, or suggestions that influence each other, for example. The output of aggregator 325 is provided as output 327 to user interface 301. Output 327 may take the form of popup interface boxes 111 and 113 depicted in FIG. 1, for example, each of which includes an illustrative one of the suggestions. As also depicted in FIG. 1, popup interface boxes 111 and 113 also include an option to search for and view examples of their respective suggestions.

If a user selects the option to search for examples of one of the suggestions, such as in popup interface boxes 111 and 113, conforming to a positive input to decision node 351 of software system 300 in FIG. 3, then one or more examples of usage of the suggested alternative strings of text may be provided. This may involve providing a string query 353 to example provider 355. String query 353 may be provided in accompaniment to their respective suggestions, after having originally been generated by the respective query selection/generation components 417, 423, 439 of illustrative evaluation modules 313, 315, 317, for example.

In one illustrative embodiment, example provider 355 may provide examples of usage of the alternative strings of text of the suggestions after performing a search for the alternative strings of text in the Web 357, as indicated by decision node 601, and/or a discrete corpus such as local index 359, as indicated by decision node 607, and providing results from the search. Local index 359 may include an indexed store of sentences from a large corpus, which may be stored locally to a computing system that hosts example provider 355, or may include content on a local area network or wide area network, for example.

The results of the search or multiple searches performed by example provider 355 may be collected in a raw set of examples 611, which may then be subjected to filter 613, which may filter and rank the examples based on degree of overlap or other indicators of relevance to the original alternative strings of text forming the suggestions. Filter 613 may also eliminate sentences that contain indicators that they are less likely to be helpful or relevant. These indicators may include profanity, personally identifiable information, unusual characters, or orthographic indicators of likely substandard usage, such as sentences that contain words in all capital characters, so that filter 613 eliminates any candidate examples that contain these indicators, in this illustrative embodiment. Other filtering criteria may be used by filter 613 in other embodiments.

Example provider 355 provides the end result as a ranked list of examples 361, which includes relevant example sentences or short snippets of text from the Web 357 or local index 359 to allow the user to see how other people are wording similar information. These examples of usage of the alternative strings of text may be presented in a view that is ranked for relevance, with the first few, most relevant examples provided on a first page or initial view of examples. This may take the form of popup output box 115 in the illustrative embodiment depicted in FIG. 1. The examples may be ranked by criteria such similarity of context, brevity, and other indicators of relevance and/or likely usefulness to the user. Similarity of context may include criteria that indicate the presence of additional words from the input string that also appear in the example strings. Once the examples are displayed, the user may select one of them to be inserted as an automatic replacement for the original string of text.

Figure 7:
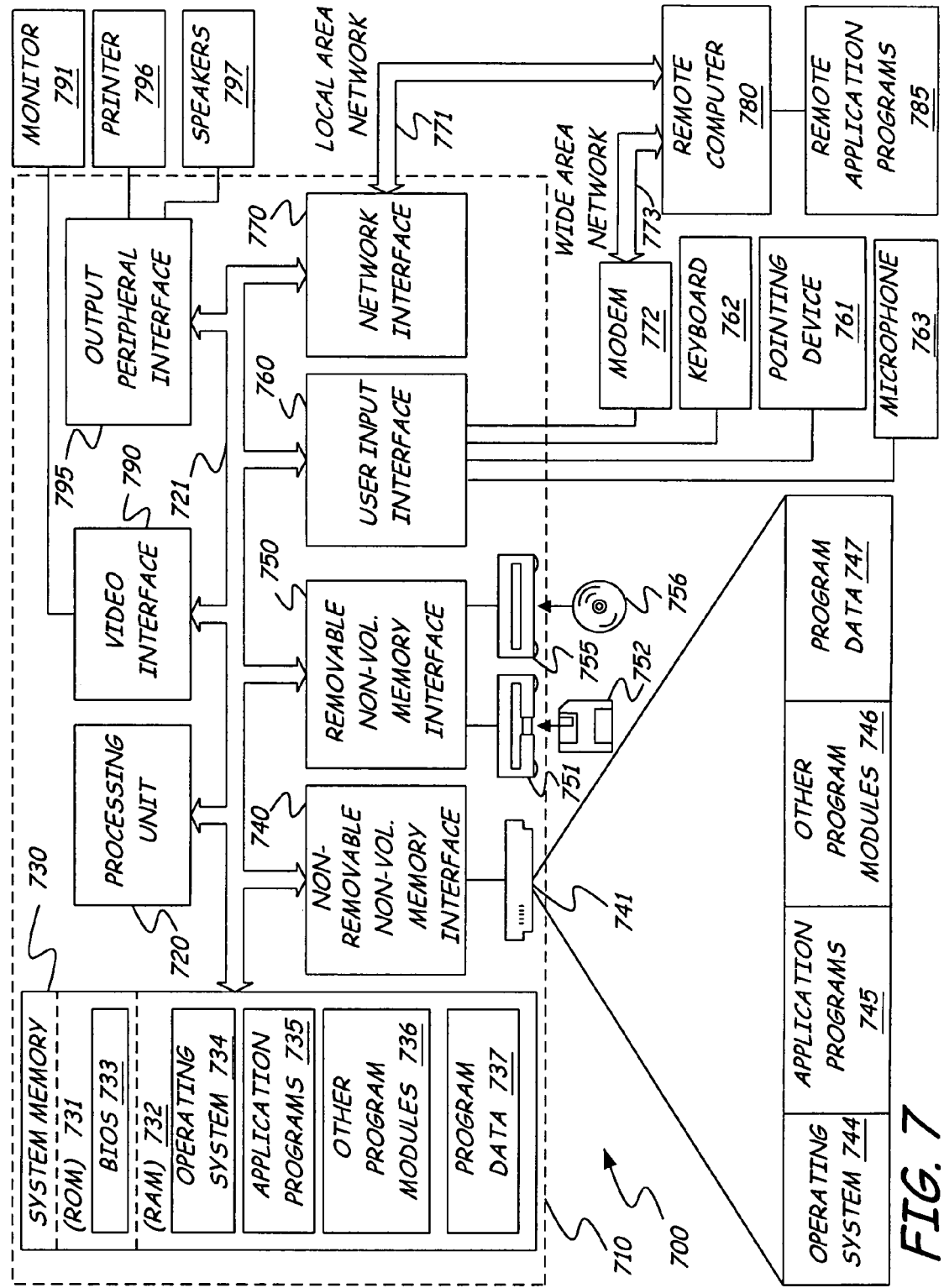
FIG. 7 depicts a block diagram of a computing environment in which some embodiments may be practiced.

FIG. 7 illustrates an example of a suitable computing system environment 700 on which various embodiments may be implemented. For example, various embodiments may be implemented as software applications, modules, or other forms of instructions that are executable by computing system environment 700 and that configure computing system environment 700 to perform various tasks or methods involved in different embodiments. A software application or module embodying a collocation error proofing embodiment may be developed in any of a variety of programming or scripting languages or environments. For example, it may be written in C#, F#, C++, C, Pascal, Visual Basic, Java, JavaScript, Delphi, Eiffel, Nemerle, Perl, PHP, Python, Ruby, Visual FoxPro, Lua, or any other programming language. It is also envisioned that new programming languages and other forms of creating executable instructions will continue to be developed, in which further embodiments may readily be developed.

According to one illustrative embodiment, computing system environment 700 may be configured to perform collocation error proofing tasks in response to receiving an indication of a word collocation in a text. Computing system environment 700 may then perform a Web search for each of one or more query templates associated with the indicated word collocation. Various query templates used may include a sentence, a reduced sentence, a chunk pair, and/or an individual word pair, any of which may include the word collocation.

Computing system environment 700 may then evaluate whether results of the Web search for each of the query templates indicates that the word collocation corresponds to normal usage, or whether it is disfavored or indicative of likely error. Normal usage may be indicated by either an exact match of the query template comprising the sentence, or a matching score that is larger than a preselected threshold. The system may then indicate, as part of the output of computing system environment 700 via a user-perceptible output device as a result of an embodiment of a collocation error proofing method, whether the word collocation corresponds to normal usage, or is disfavored and is indicated to be erroneous usage.

Computing system environment 700 as depicted in FIG. 7 is only one example of a suitable computing environment for executing and providing output from various embodiments, and is not intended to suggest any limitation as to the scope of use or functionality of the claimed subject matter. Neither should the computing environment 700 be interpreted as having any dependency or requirement relating to any one or combination of components illustrated in the exemplary operating environment 700.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices. As described herein, such executable instructions may be stored on a medium such that they are capable of being read and executed by one or more components of a computing system, thereby configuring the computing system with new capabilities.

With reference to FIG. 7, an exemplary system for implementing some embodiments includes a general-purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies.

A user may enter commands and information into the computer 710 through input devices such as a keyboard 762, a microphone 763, and a pointing device 761, such as a mouse, trackball or touch pad. Other input devices (not shown) may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 is operated in a networked environment using logical connections to one or more remote computers, such as a remote computer 780. The remote computer 780 may be a personal computer, a hand-held device, a server, a router, a network PC, a peer device or other common network node, and typically includes many or all of the elements described above relative to the computer 710. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on remote computer 780. It will be appreciated that the network connections shown are exemplary and other means of establishing a communications link between the computers may be used.

Figure 8:
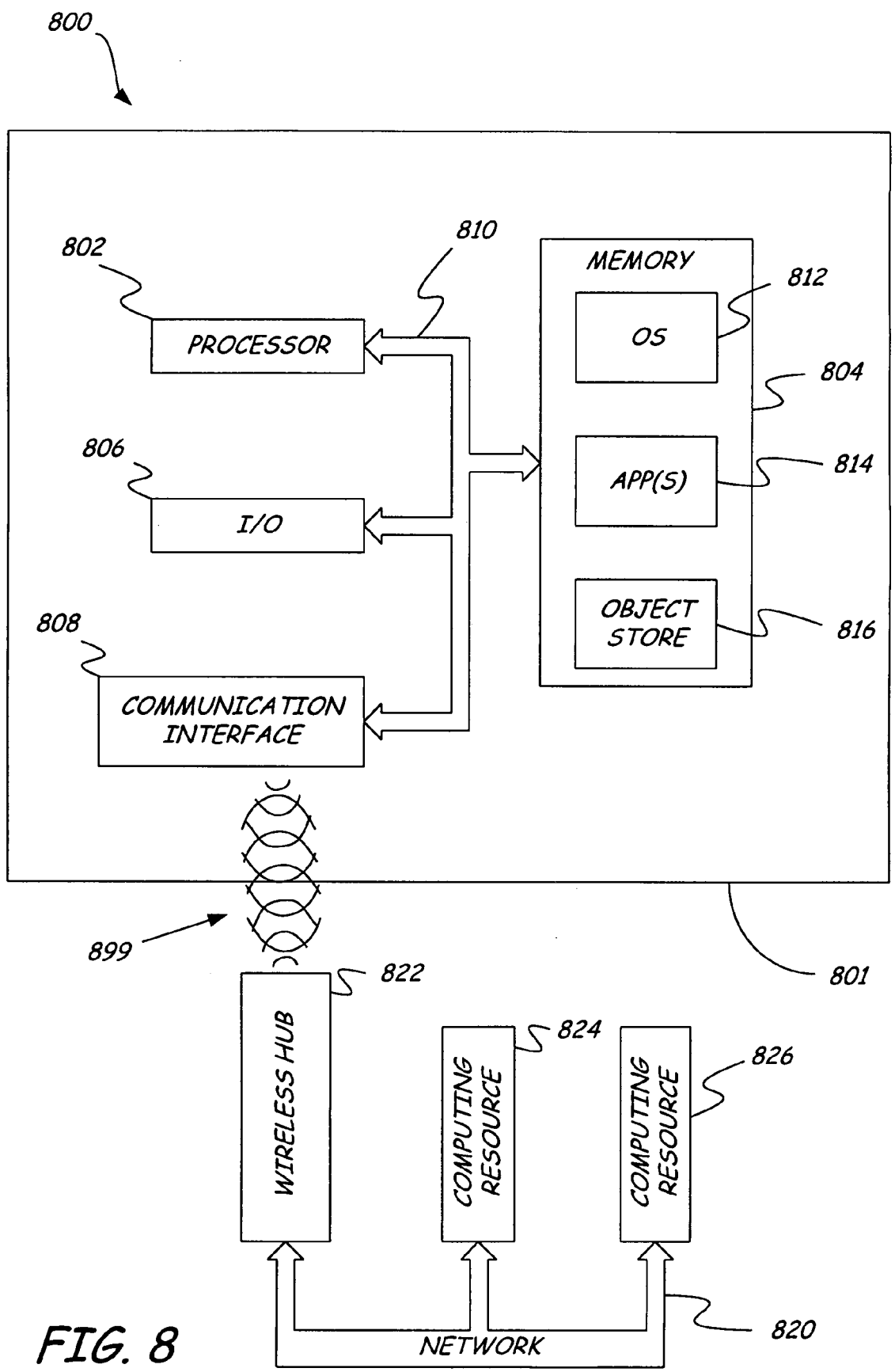
FIG. 8 depicts a block diagram of another computing environment in which some embodiments may be practiced.

FIG. 8 depicts a block diagram of a general mobile computing environment, comprising a mobile computing device and a medium, readable by the mobile computing device and comprising executable instructions that are executable by the mobile computing device, according to another illustrative embodiment. FIG. 8 depicts a block diagram of a mobile computing system 800 including mobile device 801, according to an illustrative embodiment. Mobile device 801 includes a microprocessor 802, memory 804, input/output (I/O) components 806, and a communication interface 808 for communicating with remote computers or other mobile devices. In one embodiment, the aforementioned components are coupled for communication with one another over a suitable bus 810.

Memory 804 is implemented as non-volatile electronic memory such as random access memory (RAM) with a battery back-up module (not shown) such that information stored in memory 804 is not lost when the general power to mobile device 800 is shut down. A portion of memory 804 is illustratively allocated as addressable memory for program execution, while another portion of memory 804 is illustratively used for storage, such as to simulate storage on a disk drive.

Memory 804 includes an operating system 812, application programs 814 as well as an object store 816. During operation, operating system 812 is illustratively executed by processor 802 from memory 804. Operating system 812, in one illustrative embodiment, is a WINDOWS® CE brand operating system commercially available from Microsoft Corporation. Operating system 812 is illustratively designed for mobile devices, and implements database features that can be utilized by applications 814 through a set of exposed application programming interfaces and methods. The objects in object store 816 are maintained by applications 814 and operating system 812, at least partially in response to calls to the exposed application programming interfaces and methods.

Communication interface 808 represents numerous devices and technologies that allow mobile device 800 to send and receive information. The devices include wired and wireless modems, satellite receivers and broadcast tuners to name a few. Mobile device 800 can also be directly connected to a computer to exchange data therewith. In such cases, communication interface 808 can be an infrared transceiver or a serial or parallel communication connection, all of which are capable of transmitting streaming information.

Input/output components 806 include a variety of input devices such as a touch-sensitive screen, buttons, rollers, and a microphone as well as a variety of output devices including an audio generator, a vibrating device, and a display. The devices listed above are by way of example and need not all be present on mobile device 800. In addition, other input/output devices may be attached to or found with mobile device 800.

Mobile computing system 800 also includes network 820. Mobile computing device 801 is illustratively in wireless communication with network 820—which may be the Internet, a wide area network, or a local area network, for example—by sending and receiving electromagnetic signals 899 of a suitable protocol between communication interface 808 and wireless interface 822. Wireless interface 822 may be a wireless hub or cellular antenna, for example, or any other signal interface. Wireless interface 822 in turn provides access via network 820 to a wide array of additional computing resources, illustratively represented by computing resources 824 and 826. Naturally, any number of computing devices in any locations may be in communicative connection with network 820. Computing device 801 is enabled to make use of executable instructions stored on the media of memory component 804, such as executable instructions that enable computing device 801 to perform tasks related to web-based proofing and usage guidance, in various embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. As a particular example, while the terms "computer", "computing device", or "computing system" may herein sometimes be used alone for convenience, it is well understood that each of these could refer to any computing device, computing system, computing environment, mobile device, or other information processing component or context, and is not limited to any individual interpretation. As another particular example, while many embodiments are presented with illustrative elements that are widely familiar at the time of filing the patent application, it is envisioned that many new innovations in computing technology will affect elements of different embodiments, in such aspects as user interfaces, user input methods, computing environments, and computing methods, and that the elements defined by the claims may be embodied according to these and other innovative advances while still remaining consistent with and encompassed by the elements defined by the claims herein.

What is claimed is:

1. A method, implemented at least in part by a computing system that has a processor, comprising:
    evaluating, with the processor, whether one or more strings of text include non-standard usage by:
        performing at least one search restricted to a first set of one or more data stores indicated to have relatively more reliable language usage in a language of the strings of text; and
        performing at least one search restricted to a second set of one or more data stores indicated to have relatively less reliable language usage in the language of the strings of text;
        wherein a relative proportion of matches from search results of the second set compared with the first set is used as an indicator of non-standard usage;
    providing an indication that a string of text includes non-standard usage, with one or more suggested alternative strings of text; and
    providing, with the processor, one or more examples of usage of the one or more suggested alternative strings of text.

2. The method of claim 1, further comprising using one or more evaluation modules to evaluate whether the one or more strings of text include non-standard usage, and using the one or more evaluation modules to provide the one or more suggested alternative strings of text.

3. The method of claim 2, wherein one of the evaluation modules extracts lexical features from the strings of text and evaluates the lexical features with a classifier.

4. The method of claim 3, wherein the classifier further provides at least one of the suggested alternative strings of text, based on at least one lexical feature found to be a relatively close match for at least one string of text with non-standard usage.

5. The method of claim 2, wherein one of the evaluation modules compares the strings of text with a set of regular expressions.

6. The method of claim 2, wherein one of the evaluation modules performs the at least one search through the first and second sets of data stores and compares the one or more strings of text with a the data stores, and evaluates whether the one or more strings of text conform with standard usage in the data stores.

7. The method of claim 6, wherein evaluating whether the one or more strings of text conform with standard usage in the data stores comprises evaluating the prevalence of either or both of exact matches or fuzzy matches of the one or more strings of text in the data stores.

8. The method of claim 6, wherein the data stores comprise Web content accessible to a Web search, and wherein comparing the strings of text with the corpus comprises comparing the strings of text with results from one or more Web searches for queries that include the strings of text or are analogous to the strings of text.

9. The method of claim 8 wherein performing at least one search restricted to the first set of data stores includes performing at least one Web search wherein the first set of one or more data stores comprises a first set of one or more domains and wherein performing at least one search restricted to the second set of data stores includes performing at least one Web search wherein the second set of one or more data stores comprises a second set of one or more domains.

10. The method of claim 2, further comprising detecting a subject language in which the strings of text are written, and directing the evaluation modules to evaluate the strings of text with reference to the subject language.

11. The method of claim 2, wherein the evaluation modules are accessed through an application protocol interface, and the method further comprises adding one or more additional evaluation modules conforming to the application protocol interface, and using at least one of the added evaluation modules to evaluate the strings of text.

12. The method of claim 2, wherein the one or more evaluation modules generate a plurality of suggested alternative strings of text, and wherein the method further comprises filtering out suggested alternative strings of text indicated to be unlikely, unhelpful, or duplicative.

13. The method of claim 1, wherein evaluating whether the one or more strings of text include non-standard usage comprises targeting non-standard usage involving one or more particular grammatical elements.

14. The method of claim 1, further comprising screening a plurality of candidate alternative strings of text before providing the suggested alternative strings of text, and ranking the suggested alternative strings of text in descending order of a language model score.

15. The method of claim 1, wherein the one or more examples of usage of the one or more suggested alternative strings of text are provided in response to an option for viewing the examples being selected, after the one or more suggested alternative strings of text are provided.

16. The method of claim 1, wherein providing the one or more examples of usage of the one or more alternative strings of text comprises performing a search for the alternative strings of text in at least one of the Web or a discrete corpus, and providing results from the search.

17. The method of claim 16, wherein performing the search for the alternative strings of text comprises using a query that includes one of the strings of text and one or more additional words from a sentence from which the string of text is derived.

18. The method of claim 1, further comprising providing the examples of usage of the alternative strings of text in an order ranked by criteria that include either or both of: similarity of context, and brevity.

* * * * *